(No Model.)
J. J. DOUGHTY.
HARROW.
No. 455,181. Patented June 30, 1891.
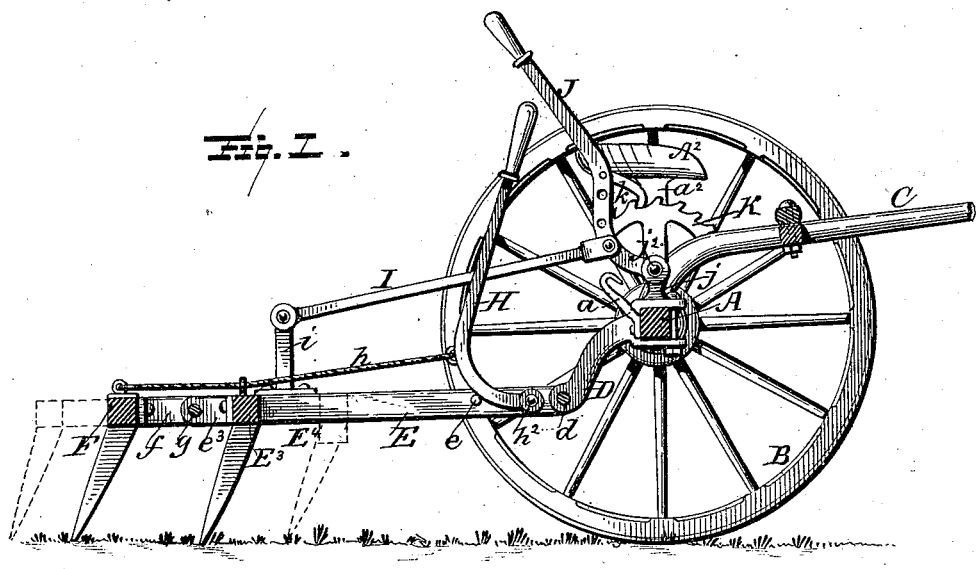
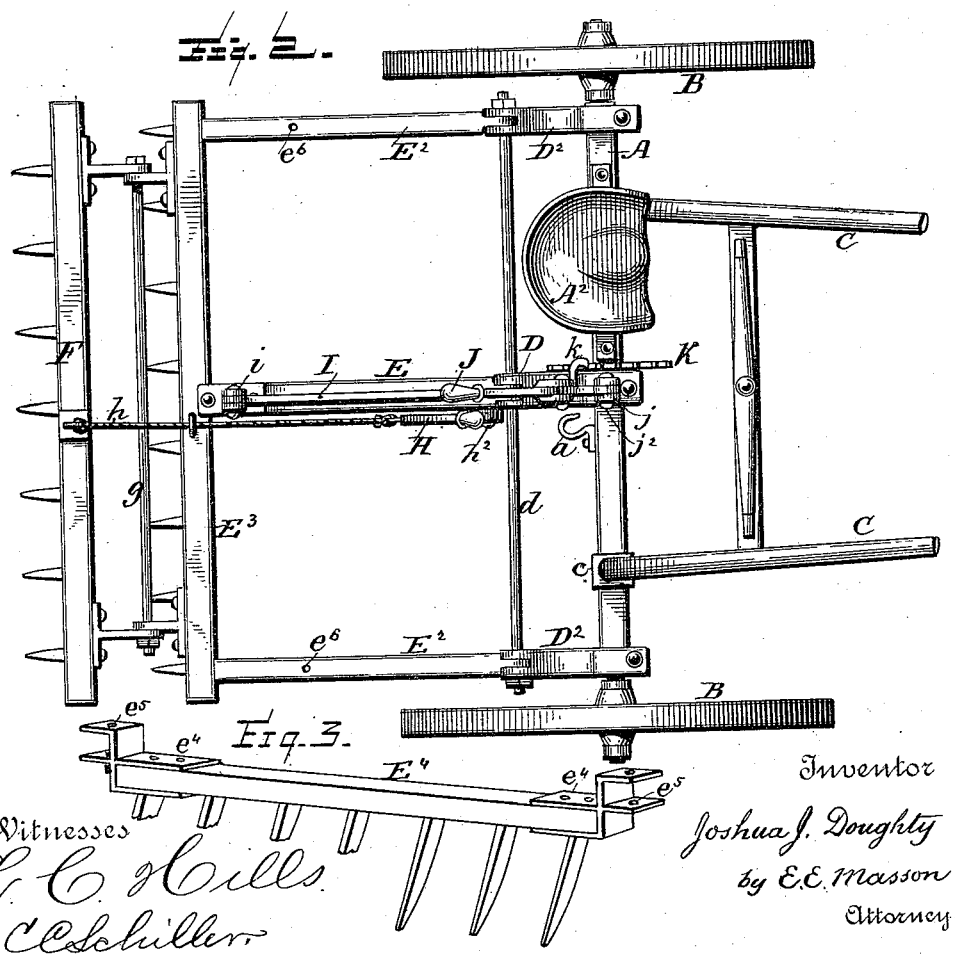
Witnesses
L. C. Hills
C. C. Schiller
Inventor
Joshua J. Doughty
by E. E. Masson
Attorney

UNITED STATES PATENT OFFICE.

JOSHUA J. DOUGHTY, OF AUGUSTA, GEORGIA.

HARROW.

SPECIFICATION forming part of Letters Patent No. 455,181, dated June 30, 1891.

Application filed September 19, 1890. Serial No. 365,531. (No model.)

*To all whom it may concern:*

Be it known that I, JOSHUA J. DOUGHTY, a citizen of the United States, residing at Augusta, in the county of Richmond, State of Georgia, have invented certain new and useful Improvements in Harrows, of which the following is a specification, reference being had therein to the accompanying drawings.

My invention relates to wheel-harrows in which a frame supported on wheels is provided with harrow-beams which may be raised and lowered at will, and in which the number of teeth-carrying beams can be removed and attached according to the class of work to be done; and it consists in the improved construction and combination of parts by which a drag-harrow in two sections can have the sections lifted independently or simultaneously, as hereinafter more fully described.

In the accompanying drawings, Figure 1 is a longitudinal vertical section of a harrow constructed in accordance with my invention. Fig. 2 is a top view of the same. Fig. 3 represents in perspective one of the removed teeth-carrying beams.

In said drawings, A represents an axle mounted on wheels B, of any suitable size. To the axle are rigidly attached, by means of clips or iron straps $c$, either the shafts C of the device if only one horse is to be used or the tongue thereof if a team is to be used. To the axle are also secured the clips D and $D^2$, which have their rearward-projecting ends extending downwardly to be connected with the longitudinal beams E or $E^2$ of the drag-harrow frame, the connection being made preferably by means of the single bolt $d$, passing through the rear ends of the clips and the forward ends of the beams E $E^2$. The rear ends of said beams are united by means of one or more of the transverse teeth-carrying beams $E^3$ $E^4$, these beams constituting the frame of the main section of the harrow. A second section consisting of one or more transverse beams F is pivotally attached to the rear beam $E^3$ of the main section by means of preferably a single bolt $g$, passing through lugs $e$ and $f$, attached, respectively, to the transverse beams of the two sections. These sections are furthermore connected together by means of a chain or cord $h$, having one end secured to one of the transverse beams of the rear section and the opposite end to a bent lever H, that has its lower end pivoted at $h^2$ to the longitudinal central beam E of the main section. The upper end or handle of said lever is in convenient reach of the driver in his seat $A^2$, said seat being secured to the axle at a suitable distance above it by means of its support $a^2$. The lever H is prevented from dropping rearwardly by having it rest against a pin $e$, projecting from the side of the central beam E, and when the lever H is pressed forward by the driver to elevate the rear section of the harrow said section can be kept elevated by locking said lever down by means of a hook $a$, pivoted to the axle of the implement. To elevate the main or inner section of the drag-harrow, the latter is provided with a short standard $i$, secured on top of the rear end of the central beam. Upon the top of the central clip D and the axle there is also a short standard $j$, that has its top slotted to receive the lower end of a hand-lever J, and a pin $j^2$, passing through said slotted standard and through the lower end of the lever, forms the pivot for the latter. This lever J is united to the standard $i$ by means of a connecting-rod I, that has its inner end adjustably retained in one of the perforations $J^2$, formed in the body of the lever J. To retain the inner section of the drag-harrow elevated, or, in fact, to hold both sections elevated, the lever J is provided with a pawl $k$ or other well-known latching device to engage with one of the notches of the segment K, and the latter is secured in a vertical position to the axle A, alongside the clip D.

To add any desired number of drag-teeth to the harrow-frame and transform the implement from a light one-horse harrow to a heavier two-horse harrow, one or more teeth-carrying beams, as $E^4$, can be added, and for that purpose they are provided with clamp-plates $e^4$, of suitable form, at their ends to embrace the side beams $E^2$ of the drag-harrow frame, and an iron pin or bolt made to pass through the perforation $e^5$ in the clamp-plates and through the perforations $e^6$ will promptly and securely retain the parts united.

Having now fully described my invention, I claim—

In a wheel-harrow, the combination of a pair of supporting-wheels and their axle, clips downwardly extended from said axle, the forward section of a drag-harrow frame pivoted to said clips, a rear section pivoted to the first section, a lever H, pivoted to the first section, and a flexible connection between said lever and the rear section, substantially as described.

In testimony whereof I affix my signature in presence of two witnesses.

JOSHUA J. DOUGHTY.

Witnesses:
P. H. LANGDON,
FRED. O. MEYRICK.